Jan. 7, 1936.  V. E. CARBONARA  2,027,088
ALTIMETER
Filed April 20, 1932  2 Sheets-Sheet 1
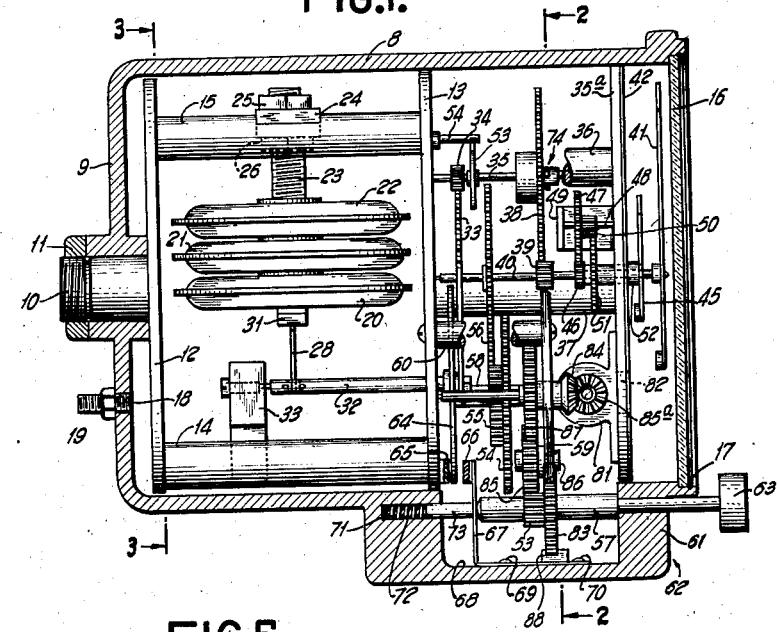
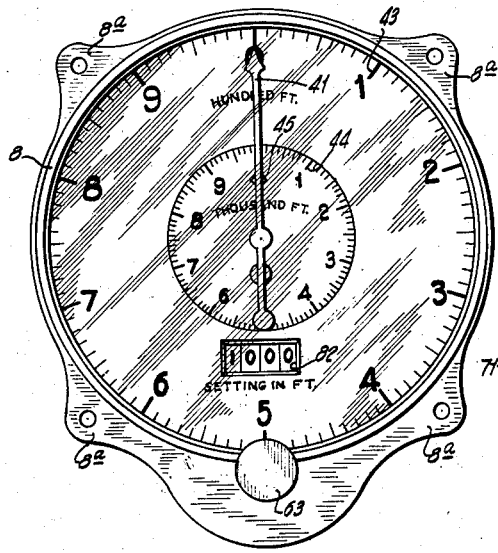
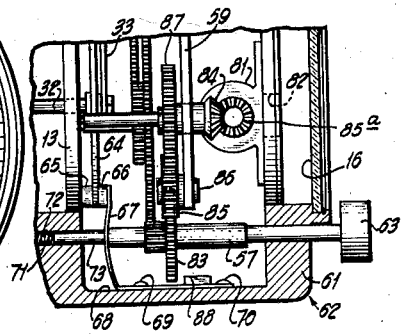
INVENTOR.
VICTOR E. CARBONARA.
BY Stephen Gerstvik.
ATTORNEY Jan. 7, 1936. V. E. CARBONARA 2,027,088
ALTIMETER
Filed April 20, 1932   2 Sheets-Sheet 2
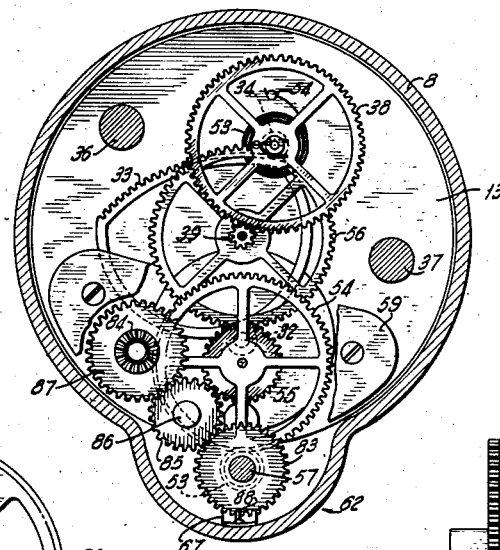
INVENTOR.
VICTOR E. CARBONARA
BY Stephen Gerstvik.
ATTORNEY Patented Jan. 7, 1936

2,027,088

UNITED STATES PATENT OFFICE 2,027,088

ALTIMETER

Victor E. Carbonara, Rockville Centre, N. Y., assignor to Bendix Aviation Corporation, South Bend, Ind., a corporation of Delaware Application April 20, 1932, Serial No. 606,504

6 Claims. (Cl. 73—4)

The present invention relates to indicating instruments such, for example, as sensitive altimeters, and is a modification of the invention disclosed in a copending application of Adolf Urfer, Serial No. 603,648, filed April 6, 1932.

In indicating instruments of certain types, such as altimeters, it is desirable that they be capable of adjustment under one condition for a second and predetermined condition and that they may indicate when said predetermined condition occurs or is reached.

In altimeters, for example, and particularly sensitive altimeters embodying a plurality of scales and cooperating pointers for indicating altitude in hundreds and thousands of feet, this feature may be embodied therein in such a manner that the altimeter may be pre-set at one airport having one pressure-level altitude with respect to sea-level for a pressure-level altitude of another airport to and at which it is desired to fly and land so that when the aircraft on which the altimeter is carried lands at the second airport the altimeter will indicate zero altitude, thereby providing the pilot with correct indications of the altitude of his craft with respect to the ground at the airport where he is going to land.

Although, as indicated above, the invention finds its maximum utility when applied to altimeters, and more particularly to sensitive altimeters having a plurality of pointers, it is to be expressly understood that it may be readily and advantageously embodied in other types of indicating instruments such, for example, as aneroid thermometers, barometers, pressure gauges, flow meters, stress indicators, hygrostats, and the like.

While the invention is adapted for use with indicating instruments of the various types set forth above it may be stated that in certain types of altimeters movable reference marks and bodily rotatable actuating units, including the pressure-sensitive element and the amplification mechanism, are employed for setting the altimeter to indicate the pre-set altitude at the time of setting and to indicate when such altitude is reached. Such arrangements, however, have the disadvantage that the reference marks move as a unit with the pointers in the same direction with respect to the scales when the setting is being made, thereby giving an indication of the pre-set condition or altitude as a negative quantity which requires conversion into a positive quantity. Furthermore, in such arrangements the indicating movements and the setting movements occur simultaneously so that a reading of an indication of the pointers at such times is confusing and meaningless. Accordingly, one of the objects of the present invention is to provide a novel indicating instrument embodying novel setting and indicating means whereby the foregoing difficulties are eliminated and whereby more accurate settings and indications are produced.

Another object is to provide a novel indicating instrument which is so constructed and arranged as to enable one to pre-set the instrument for a predetermined condition in order that a desired result may be obtained or a selected objective reached, the instrument also being adapted to indicate the various conditions which are taking place before the predetermined condition occurs or is reached.

Another object of the invention is to provide a novel indicating instrument embodying a construction whereby the user is enabled to pre-set the instrument for a particular condition without rendering the instrument ineffective thereafter to clearly indicate conditions other than the pre-set condition.

Another object is to provide in an indicating instrument embodying an actuating unit responsive to certain conditions and/or changes in conditions, substances or operations, novel means whereby the actuating unit is rendered ineffective during the setting of the instrument for a predetermined condition without disturbing the relation existing between the actuating unit and the indicating element or elements.

A further object of the invention is to provide in a sensitive altimeter, novel means whereby relative movement is produced between the scales and the pointers for setting the altimeter and whereby the pressure-sensitive element of the altimeter is adapted to be rendered inoperative during the setting action so that the altimeter will produce a desired indication when a predetermined altitude is reached and also whereby the predetermined altitude is indicated as a positive value when the setting is made, the latter indication remaining unaffected by the indicating action of the instrument and being independent of the scales with which the pointer or pointers cooperate.

A still further object is to provide a novel sensitive altimeter which is so constructed and arranged that the operative connections between the pressure-sensitive means and the indicating means are not broken during setting of the instrument for a predetermined altitude, and the pressure-sensitive means are adapted to be rendered ineffective to actuate the indicating means during the setting operation.

The above and other objects and advantages of the invention will appear more fully hereinafter from a consideration of the detailed description which follows, taken together with the accompanying drawings wherein is illustrated one embodiment of the invention. It is to be expressly understood, however, that the drawings are only for the purpose of illustration and description and are not designed as a definition of the limits of the invention, primary reference being had for this purpose to the appended claims. In the drawings, wherein like reference characters refer to like parts throughout the several views, Fig. 1 is a longitudinal sectional view of the casing showing the functional relationship of the various elements of one form of indicating instrument embodying the present invention;

Fig. 2 is a cross-sectional view taken on line 2—2 of Fig. 1;

Fig. 3 is another cross-sectional view taken on line 3—3 of Fig. 1;

Fig. 4 is a partial view of the setting mechanism in position to be operated;

Fig. 5 is a front elevational view of the instrument shown in Fig. 1; and

Figs. 6 and 7 are detail front and side views, respectively, of one form of clutch mechanism employed in the instrument embodying the present invention.

Referring to the drawings, and more particularly to Figs. 1, 2, and 3, an instrument embodying the invention is shown in the form of an altimeter having an evacuated pressure-sensitive device which is adapted to expand and contract upon variations of pressure due to changes in altitude, and an amplification mechanism for amplifying the relatively small movements of the pressure-sensitive device into readily discernible movements of a plurality of pointers over co-operating scales to indicate the altitude in feet or meters or in terms of barometric pressure if desired, the pointers being geared together in such a manner that one moves only a fraction of a revolution for one complete revolution of the other, the latter indicating the altitude in hundreds of feet and the former in thousands of feet or in other units having the same or different ratios.

As illustrated, the altimeter includes a casing or housing 8 which is preferably formed of a light material such as aluminum and which in general outline is cup-shaped having a closed end 9, to the inner surface of which is attached, as by means of a screw 10 and nut 11, a frame for supporting certain elements of the instrument and for maintaining the same in spaced operative relation. Preferably, the frame includes a pair of discs or plates 12 and 13 which are fixedly held in spaced relation by means of suitable spacing rods 14, 15 and 15a. The front end of the housing or casing is closed by a transparent member 16 removably secured in position in any suitable manner well known in the art, as for example by a clamping ring 17. The casing is not sealed but is left open to atmospheric pressure in any suitable manner, as by means of an opening 18 provided in the rear wall 9. If the instrument is to be used on aircraft the casing may have one end of a tube (not shown) connected to the opening 18 in any suitable manner as by means of a nipple 19, the opposite end of the tube being led to a point of static pressure so that the pressure inside of the casing 8 will be unaffected by motion of the aircraft and will vary solely in accordance with pressure changes due to changes in altitude.

The pressure-sensitive device, in the embodiment illustrated, is constituted by one or more aneroid capsules such as, for example, 20, 21, and 22. The upper surface of the capsule 22 is secured as by means of brazing to a threaded rod 23 adjustably secured to a transversely extending bar 24 (Fig. 3) as by means of locking nuts 25 and 26. The outer ends of the bar 24 are attached in any suitable manner to the upper surface of rods 15 and 15a, as for example by brazing or soldering.

Means are provided for employing and amplifying the movements of the walls of the aneroid capsules 20, 21, and 22 due to changes in pressure to produce indications in terms of barometric pressure or altitude in feet or meters. As illustrated, said means include a pair of links 27 and 28 pivotally connected together at 29, the link 28 being pivotally connected to the aneroid capsule 20 through a temperature compensating element 30 and a bracket 31, and the link 27 being rigidly connected to a rock-shaft 32 journaled at the inner end thereof in an arm 33 which is secured in any suitable manner to the spacing rod 14, as for example by brazing or soldering.

The rock-shaft 32 is also journaled in the plate or disc 13 and has secured thereto or formed integral therewith a gear sector 33 which is arranged to mesh with a pinion 34, the latter being carried by a counter-shaft 35 having one end thereof journaled in the disc 13 and its other end journaled in another disc or plate 35a located in the front of the casing 8 and secured to the disc 13 in spaced relation therewith in any suitable manner, as by means of spacing rods 36 and 37. Secured to the shaft 35 is a relatively large gear 38 which meshes with a pinion 39 carried by another counter-shaft 40 which is also journaled in the discs or plates 13 and 35a and which extends through the latter disc to constitute a pointer shaft on which is carried a large pointer 41. The pointer 41 is arranged to traverse a dial 42 secured to the plate or disc 35a and upon which is engraved or etched a suitable scale 43 marked in hundreds of feet for example. Concentric with the scale 42 is another scale 44 which is graduated in thousands of feet and has cooperating therewith a small pointer 45. In order that the pointer 45 shall move with respect to its scale 44 and with the pointer 41 in the ratio existing between the scales 43 and 44 the pointers are geared together in such a manner that the pointer 45 moves only a fraction of a revolution for one complete revolution of pointer 41, and for this purpose another pinion 46 is secured to or formed integral with the counter-shaft 40 and arranged to mesh with a gear 47 carried by a shaft 48 which is journaled in the plate or disc 35a and in a bracket 49 carried by the latter. Secured to or formed integral with the gear 47 is a pinion 50 which meshes with a gear 51 carried by a hollow shaft 52 which is concentric with the large pointer shaft 40 and to which is secured the small pointer 45. A hairspring 53 is also provided for preventing back-lash in the gear train between the rock-shaft 32 and the pointers 41 and 45 and has its outer end anchored to a pin 54 carried by the plate or disc 13 and its inner end secured to the shaft 35.

It will be apparent from the foregoing that as the aneroid capsules 20, 21, and 22 are actuated by barometric pressure due to changes in altitude the rock-shaft 32 is operated through the links 27 and 28 to cause movement of the gear sector 33, thereby operating the pointers 41 and 45 in the proper ratio through the gear trains 34, 38, 39 and 46, 47, 50, 51, respectively. It will also be apparent that the pointers 41 and 45 will indicate the altitude with respect to sea-level and not the true altitude with respect to the ground, that is, the pointers would indicate zero only when the instrument is at sea-level under normal conditions and, therefore, it is desirable that the instrument be capable of adjustment to indicate zero when the instrument is on the ground regardless of the altitude of the ground with respect to sea-level. It is further desirable that the instrument be capable of adjustment under one condition for a second condition and to indicate when the second condition occurs or is reached but without breaking the operative connections between the pointer and the expansible pressure-sensitive elements or aneroid capsules during the setting of the instrument for the pre-selected condition in order that said instrument may immediately and automatically indicate the true altitude upon completion of the setting operation. This may be accomplished by rendering the aneroid capsules 20, 21, and 22 ineffective or inoperative during the time that the pointers are being rotated with respect to their scales to obtain the desired setting. For this purpose novel means are provided to effect such an adjustment independently of the indicating action, and in the form shown comprise means for causing relative movement between the pointers and their respective scales so that the pointers will indicate zero when the instrument reaches the altitude for which it was set, said means being separate from but interconnected with the transmission through which the pointers are operated during indicating action, and means for holding the rock-shaft stationary during such setting, but the holding means are not absolutely essential to the operation of the setting means and, if desired, may be dispensed with so that the setting action may be performed while the indicating action takes place, i. e., so that the pointers may be operated simultaneously by the setting means and by the actuating device constituted, in the present instance, by the aneroid capsules 20, 21, 22. Said first means include a gear train comprising a pinion 53, gear 54, pinion 55, and gear 56 which are interposed between an actuating shaft 57 and the large pointer shaft 40 to the latter of which is secured the gear 56, the gear 54 and pinion 55 being carried by a shaft 58 journaled in the plate or disc 13 and in an auxiliary plate 59, the latter being secured to the plate 13 in spaced relation thereto by means of spacing rods, one of which is partly shown at 60. The shaft 57 is journaled and arranged for longitudinal movement in a wall 61 of an enlarged portion 62 of the casing 8 formed at the bottom of the latter. Said shaft 57 is arranged to be moved longitudinally to the left and to be rotated from the front of the casing by means of a knob 63 whereby the pointers 41 and 45 are rotated through their respective gear trains as indicated above.

In order that the rock-shaft 32 may be prevented from actuating the pointers during the setting action there are provided novel means embodying a brake mechanism which is rendered effective upon the longitudinal movement of the actuating shaft 57, in the present instance, to the left, as viewed in Fig. 1, to hold said rock-shaft against rotation. Said brake mechanism is constituted by a brake member in the form of a disc 64 rigidly secured to the rock-shaft 32 and a pair of cooperating brake or friction members 65 and 66, the former of which is positioned on one side of the member 64 and secured to the plate 13, and the other of which is positioned on the opposite side of the disc 64 and carried by a resilient member 67 secured to the bottom wall 68 of the casing extension 62 in any suitable manner as by means of screws 69 and 70. Normally, the movable brake or friction member 66 does not engage the brake member 64 but is arranged to do so upon longitudinal movement of the shaft 57 to the left against the compression of a coil spring 71 located in a recess 72 formed in the casing extension 62, and by means of a rod or pin 73 which cooperates with the spring 71 to maintain the member 66 out of engagement with its cooperating brake 64 and also to move the shaft 57 outwardly of the casing after the knob 63 has been released. However, as pointed out hereinbefore, the brake disc 64 and cooperating brake members 65, 66, and, hence, resilient member 67 and rod 73, may be dispensed with without impairing the setting and/or indicating actions of the instrument. It will now be apparent that as the shaft 57 is moved longitudinally to the left by means of the knob 63 the movable brake member 66 is caused to engage the cooperating brake member 64 to hold the latter against the fixed brake member 65 whereby rotation of the rock-shaft 32 is prevented and hence the aneroid capsules 20, 21, and 22 rendered inoperative. At the same time that the brake mechanism is operated, the pinion 53 meshes with the gear 54 so that when the knob 63 is rotated the pointers 41 and 45 are actuated for setting thereof to the predetermined condition so that they will produce a desired indication on their cooperating scales 43 and 44, such as zero for example, when the desired condition occurs or is reached. It will be seen, however, that when the pointers 41 and 45 are actuated for setting by means of the gear train 53, 54, 55, and 56 the gear 38 carried by the shaft 35 is also actuated by means of the pinion 39 and hence would tend to cause the counter-shaft 35 to be rotated. Means are therefore provided to permit the gear 38 to rotate on the shaft 35 without actuating the latter during the setting action, thereby permitting relative movement between the motion-amplifying mechanism and the pointers at this time but causing said mechanism to operate said shaft 35 and the pointers by the rock shaft 32 during normal indicating action, and in the form shown comprise a one-way drive constituted by a one-way clutch 74 which is shown in detail in Figs. 6 and 7, and which is constituted by a hub 75 formed integral with the gear 38 having a semi-circular notch 76 adjacent the gear, and a spring 77 secured to the gear in any suitable manner as by means of a screw 78 and being formed to provide a pair of fingers 79 and 80, one of which is seated in the notch 76 to engage the shaft 35 and the other of which engages the exterior of the hub 75 on the opposite side of the notch 76. The operation of this clutch is such that when the shaft 35 is being operated by means of the gear sector 33 and pinion 34 the gear 38 is caused to rotate therewith by means of the clutching action produced by the fingers 79 and 80 of the spring 77 against the shaft 35 and the hub 75, respectively. If, however, the shaft 35 is maintained stationary by virtue of the braking action on the rock-shaft 32, and the gear 38 is rotated upon operation of the knob 63, slipping action takes place between the shaft 35 and the gear 38 so that the latter merely slips thereon thus providing a one-way drive.

When the instrument has been set to give a predetermined reading for a pre-selected altitude it is desirable that means be provided for indicating said selected altitude and that this indication be undisturbed during normal function of the instrument while the same is being moved to the pre-selected altitude, in the case of an altimeter, or while the predetermined condition is taking place in the case of instruments of other types to which the invention may be applied. To this end means are provided whereby the indication of the desired condition or altitude for which the instrument is set is produced simultaneously with the rotation of the pointers and while the aneroid capsules are rendered ineffective. In the form shown said means comprise a counter 81 carried by the plate 35a and arranged so that the number-carrying dials thereof are visible through an opening 82 provided in the dial 42 at any convenient point, as for example, just below the scale 44.

The number-carrying dials of the counter, which in the present instance are marked in feet, are actuated simultaneously with the setting of the pointers by means of the knob 63 through a gear 83 carried by the actuating shaft 57 and preferably formed as a unit with the pinion 53, and which, upon actuation of the shaft 57 to the left, operates a beveled pinion 84 through a gear train comprising a gear 85 carried by a stub-shaft 86 journaled in the plate 59 and a gear 87 which is carried by the same shaft as the beveled pinion 84. The beveled pinion 84 is in constant mesh with a beveled gear 85a which actuates the number-carrying dials on the counter.

A projecting tooth 88 fixed to the wall 68 is provided for preventing rotation of the shaft 57 when the knob 63 is in its outward or non-setting position, by engaging the gear 83 as shown in Fig. 1.

It will be apparent from the foregoing that when the knob 63 is actuated to the left, as viewed in Fig. 1, and rotated to adjust the instrument for a desired condition, the rock-shaft 32 is locked against rotation by means of the brake mechanism described above and hence the aneroid capsules are rendered inoperative, and relative movement is simultaneously caused between the pointers and their respective scales through their respective gear trains so that a predetermined relation is established between the pointers and the scales whereby a desired indication is produced when the pre-selected condition or altitude occurs or is reached. Simultaneously with the actuation of the pointers by means of the knob 63 the counter 81 is also operated to indicate the condition for which the instrument has been set. The knob 63 is then released and by the action of the spring 71 and pin 73 the shaft 57 is caused to be moved to the right as viewed in Fig. 1, thereby releasing the brake mechanism and demeshing the gears 53, 54, and gears 83, 85 and thereafter the pointers are operated independently of the counter through their respective gear trains and through the amplification mechanism to produce the required indication on the scales 43 and 44 when the condition for which the instrument has been set occurs or has been reached and which condition has been indicated on the counter. The setting of the counter, however, remains unchanged during the indicating action of the pointers and until the instrument is again adjusted by means of the knob 63.

There is thus provided a novel indicating instrument which may be set under one condition for a second condition so that it will indicate when the second condition occurs or is reached and which also indicates the condition for which it has been set, independently of the indicating action of the instrument, and as pointed out hereinbefore, the invention is particularly suitable for use in a sensitive altimeter whereby the pilot may set his instrument at a flying field having one pressure-level altitude so that it will indicate zero when he reaches a second flying field whose pressure-level altitude is different from that of the first flying field and which altitude can be set into the instrument as a positive indication.

There is also provided a novel altimeter which is adapted for ready installation and inexpensive manufacture and one which will indicate at all times the true altitude, and which may be set in advance to indicate the pre-selected objective. The pre-selected altitude indication is maintained without interference with the normal operation of the altimeter and the latter may be adjusted without disturbing or breaking the operative connections between the pressure-sensitive elements and the pointers.

Although only one embodiment of the invention has been illustrated and described, various changes and modifications, which will now appear to those skilled in the art, may be made in the details of construction and arrangement of parts without departing from the scope of the invention. For example, the counter may be replaced by any other type of indicator which is adapted for simultaneous actuation by the knob 63 when the adjustment is made between the pointers and scales. It is also obvious that the reference scale or counter and the indicating scales 43 and 44 may be calibrated in any suitable units depending upon the purpose for which the instrument is to be utilized. As will be understood by those skilled in the art, the invention is not limited to an altimeter since, as has been pointed out, certain novel features thereof are applicable to a plurality of indicating instruments and, reference, therefore, will be had primarily to the appended claims for a definition of the limits of the invention.

What is claimed is:

1. In an indicating instrument, the combination of pointer means, scale means, an actuating device responsive to changes in conditions or operations, transmission means including a shaft having a one-way clutch thereon for operating said pointer means upon operation of said actuating device for indicating action, said one-way clutch including a gear mounted on said shaft and having a hub provided with a transverse opening adjacent said gear for exposing said shaft, and a spring secured to said gear and formed to provide a pair of fingers one of which is seated in said opening to engage said shaft and the other of which engages the exterior of the hub on the opposite side of the opening, means for causing relative movement between the scale means and pointer means for setting the instrument for a predetermined condition so that the pointer means will give a desired indication when said condition occurs, said means comprising another transmission means separate from but interconnected with said first transmission means through said one-way clutch, and means independent of said scale means and operable simultaneously with said setting means for indicating the condition for which the instrument is set.

2. In an indicating instrument, the combination of pointer means, scale means, an actuating device responsive to changes in conditions or operations, transmission means including a shaft having a one-way clutch thereon for operating said pointer means upon operation of said actuating device for indicating action, said one-way clutch including a gear mounted on said shaft and having a hub provided with a transverse opening adjacent said gear for exposing said shaft, and a spring secured to said gear and formed to provide a pair of fingers one of which is seated in said opening to engage said shaft and the other of which engages the exterior of the hub on the opposite side of the opening, and means for causing relative movement between the scale means and pointer means for setting the instrument for a predetermined condition so that the pointer means will give a desired indication when said condition occurs, said means comprising another transmission means separate from but interconnected with said first-mentioned means through said one-way clutch.

3. In an indicating instrument, the combination of a plurality of pointers, one of which moves a fraction of a revolution for a complete revolution of the other, scale means for the pointers, an actuating device responsive to changes in conditions or operations, transmission means including a shaft having a one-way clutch thereon for operating said pointers upon operation of said actuating device for indicating action, said one-way clutch including a gear mounted on said shaft and having a hub provided with a transverse opening adjacent said gear for exposing said shaft, and a spring secured to said gear and formed to provide a pair of fingers one of which is seated in said opening to engage said shaft and the other of which engages the exterior of said hub on the opposite side of the opening, and means for causing relative movement between the pointers and the scale means for setting the instrument for a predetermined condition so that the pointers will indicate when said condition occurs or is reached, said means comprising another transmission means separate from but interconnected with said first-mentioned means through said one-way clutch.

4. In an indicating instrument, the combination of a plurality of pointers, one of which moves a fraction of a revolution for a complete revolution of the other, scale means for the pointers, an actuating device responsive to changes in conditions or operations, transmission means including a shaft having a one-way clutch thereon for operating said pointers upon operation of said actuating device for indicating action, said one-way clutch including a gear mounted on said shaft and having a hub provided with a transverse opening adjacent said gear for exposing said shaft, and a spring secured to said gear and formed to provide a pair of fingers one of which is seated in said opening to engage said shaft and the other of which engages the exterior of said hub on the opposite side of the opening, means for causing relative movement between the pointers and the scale means for setting the instrument for a predetermined condition so that the pointers will indicate when said condition occurs or is reached, said means comprising another transmission means separate from but interconnected with said one-way clutch, and means independent of said scale means and operable simultaneously with said setting means for indicating the condition for which the instrument is set.

5. In an altimeter, the combination of pointer means, scale means, a pressure sensitive device, transmission means including a shaft having a one-way clutch thereon for operating said pointer means by said device, said one-way clutch including a gear mounted on said shaft and having a hub provided with a transverse opening adjacent said gear for exposing said shaft, and a spring secured to said gear and formed to provide a pair of fingers one of which is seated in said opening to engage said shaft and the other of which engages the exterior of the hub on the opposite side of said opening, and means for causing relative movement between said pointer means and said scale means for setting the altimeter to a predetermined altitude or barometric pressure so that said pointer means will give a desired indication when said altitude or barometric pressure is reached, said last-named means comprising another transmission means separate from but interconnected with said transmission means through said clutch whereby relative movement is effected between the first transmission means and the pointer means during setting but unitary movement while indicating.

6. In an altimeter, the combination of pointer means, scale means, a pressure sensitive device, transmission means including a shaft having a one-way clutch thereon for operating said pointer means by said device, said one-way clutch including a gear mounted on said shaft and having a hub provided with a transverse opening adjacent said gear for exposing said shaft, and a spring secured to said gear and formed to provide a pair of fingers one of which is seated in said opening to engage said shaft and the other of which engages the exterior of the hub on the opposite side of said opening, means for causing relative movement between said pointer means and said scale means for setting the altimeter to a predetermined altitude or barometric pressure so that said pointer means will give a desired indication when said altitude or barometric pressure is reached, said last-named means comprising another transmission means separate from but interconnected with said transmission means through said clutch whereby relative movement is effected between the first transmission means and the pointer means during setting but unitary movement while indicating, and means simultaneously operable with said setting means for indicating the predetermined altitude or barometric pressure for which the altimeter has been set.

VICTOR E. CARBONARA.